United States Patent
Kasuya

(10) Patent No.: US 8,711,490 B2
(45) Date of Patent: Apr. 29, 2014

(54) LENS SYSTEM

(75) Inventor: Junichi Kasuya, Ageo (JP)

(73) Assignee: Canon Kabushiki Kaisha (JP)

(*) Notice: Subject to any disclaimer, the term of this patent is extended or adjusted under 35 U.S.C. 154(b) by 91 days.

(21) Appl. No.: 13/313,079

(22) Filed: Dec. 7, 2011

(65) Prior Publication Data

US 2012/0154927 A1   Jun. 21, 2012

(30) Foreign Application Priority Data

Dec. 17, 2010   (JP) ................. 2010-281453

(51) Int. Cl.
*G02B 15/14* (2006.01)
*G02B 7/02* (2006.01)

(52) U.S. Cl.
USPC ...................... 359/698; 359/697; 359/820

(58) Field of Classification Search
USPC .................. 359/694–704, 811–830
See application file for complete search history.

(56) References Cited

U.S. PATENT DOCUMENTS

| | | | |
|---|---|---|---|
| 5,148,201 A | 9/1992 | Umetsu et al. | |
| 5,872,433 A | 2/1999 | Sakai | |
| 6,738,197 B2 * | 5/2004 | Fujii | 359/698 |
| 8,289,442 B2 * | 10/2012 | Hirai | 348/372 |
| 2011/0267706 A1 * | 11/2011 | Karasawa | 359/698 |

FOREIGN PATENT DOCUMENTS

| | | |
|---|---|---|
| JP | 9304680 A | 11/1997 |
| JP | 2000111780 A | 4/2000 |
| JP | 3483211 B2 | 1/2004 |
| JP | 2005-077698 A | 3/2005 |
| WO | 2009/044837 A1 | 4/2009 |

OTHER PUBLICATIONS

European Search Report issued in counterpart application No. EP11009610.4, dated Mar. 26, 2012.
Chinese Office Action issued in Chinese counterpart application No. CN201110424221.8, dated Dec. 11, 2013. English translation provided.

* cited by examiner

*Primary Examiner* — Mohammed Hasan
(74) *Attorney, Agent, or Firm* — Rossi, Kimms & McDowell, LLP

(57) ABSTRACT

A lens system includes: a lens unit; a drive unit driving the lens unit in an optical axis direction; a detector detecting a position of the lens unit; a lens operation unit that operates driving of the lens unit; and a computing unit that computes a positional command value for controlling driving of the lens unit based on a signal input from the lens operation unit and controls driving of the lens unit; a time setting unit; and a threshold setting unit setting a positional difference threshold for switching the first and second current values set in the drive unit. When the difference between the positional command value and the lens position is larger than the positional difference threshold and duration after the second current value is set has not exceeded the high-current maximum time, the second current value is set. In other cases, the first current value is set.

9 Claims, 7 Drawing Sheets

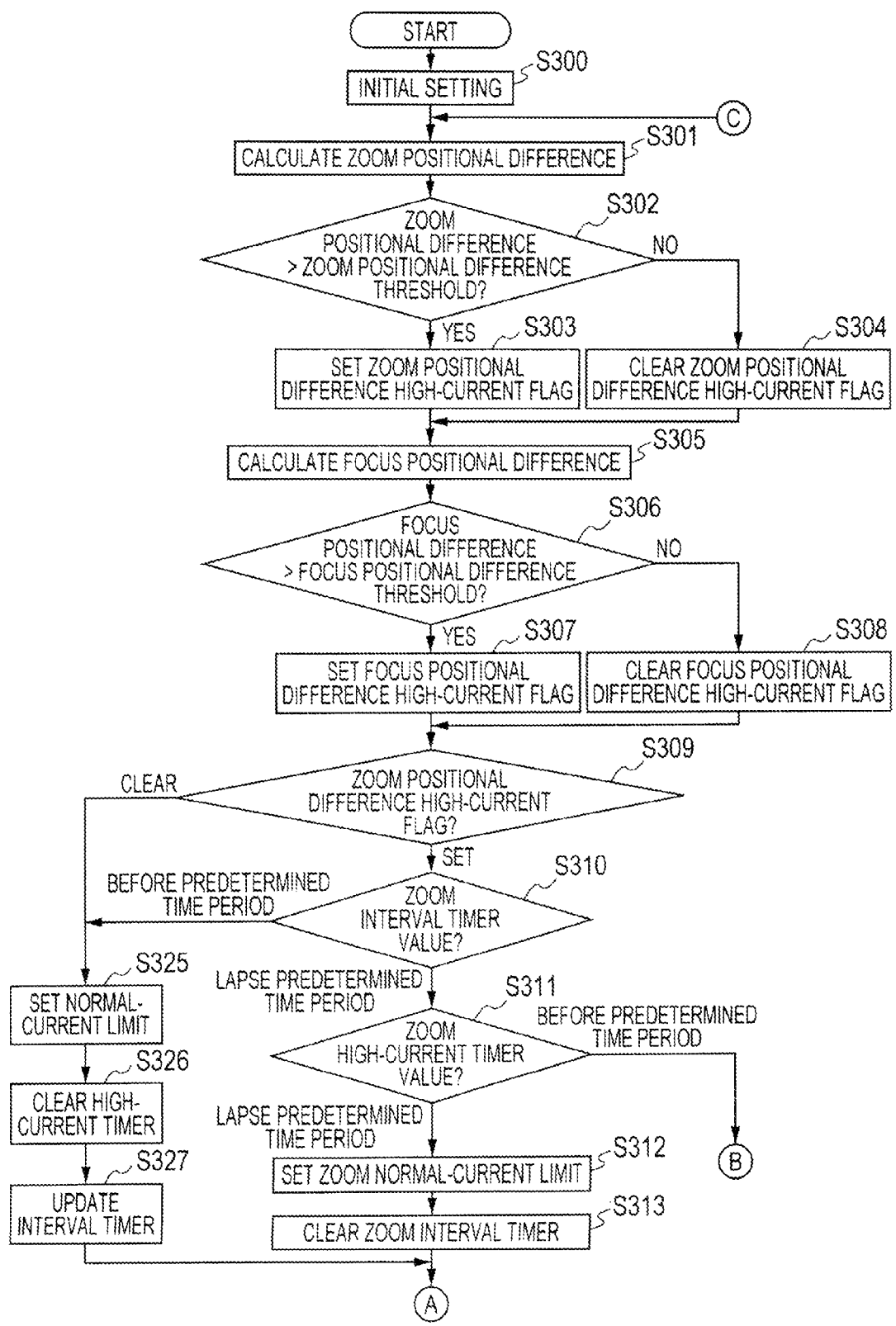

LENS SYSTEM

BACKGROUND OF THE INVENTION

1. Field of the Invention

The present invention relates to lens systems, such as a television lens and a video lens, that allow taking moving images.

2. Description of the Related Art

As to the lens systems that are used for a television lens and a video lens and allow taking moving images, there are many cases where a zoom lens unit conducting a zooming function and a focus lens unit conducting a focusing function are electrically driven using a motor in view of ease of operation for image taking and compatibility with a function to which an auto focus function is added.

In such a lens system, power supply to be consumed on a lens side is supplied from a camera, which the lens system is mounted on or incorporated with, to this lens system. In such a system, on the camera side, it is necessary to secure a capacity of power supply to be consumed on the lens side in addition to a capacity of power supply required to operate a function as a camera. However, demands for a small, lightweight and inexpensive camera impose a limitation on the capacity of power supply capable of being continuously supplied to the lens.

With this limitation, various proposals have been made to efficiently drive a motor of a lens.

For instance, Japanese Patent No. 3483211 discloses a lens for a television camera that identifies the type of a lens to be driven and changes the maximum value of current for driving the lens according to the type of the lens. Further, Japanese Patent Application Laid-Open No. 2000-111780 discloses a lens apparatus that changes the maximum value of drive current set with reference to a lens having a heavy weight to be driven according to the type of the lens apparatus.

A lens system that allows taking moving image and used for any of a television lens and a video lens has strongly been demanded to have higher magnification and higher image quality. In a case of supplying a new product, it is necessary to supply the market with products meeting these demands.

As a result of meeting these demands, there is a tendency of increasing both the weights of a zoom lens unit conducting a zooming function and a focus lens unit conducting a focusing function. In other hand, the capacity of power supply capable of being continuously supplied from the camera to the lens held by this camera is limited to the same capacity as the conventional level. Accordingly, in a case of simply increasing the maximum value of the drive current, the capacity of power supply from the camera is exceeded, which may cause failure of the camera.

For instance, in the conventional arts disclosed in Japanese Patent No. 3483211 and Japanese Patent Application Laid-Open No. 2000-111780, for the lens system having increased weights of both the zoom lens unit and the focus lens unit in comparison with a conventional lens units, the maximum value of current for driving the lens system according to the type of the lens units. However, if the maximum value of current for driving the lens system is not changed, drive characteristics become worse because of the increase in weight of the lens units in comparison with the conventional lens units.

If the reference drive current value is increased in accordance with the amount of increase in weight of the lens units, the increased current value exceeds the capacity of power supply on the camera side, which may cause failure of the camera.

Thus, it is an object of the present invention to provide a lens system that enables drive characteristics for the lens unit to be improved without affecting the camera.

SUMMARY OF THE INVENTION

A lens system of the present invention to attain the above object includes: a lens unit; a drive unit for driving the lens unit in an optical axis direction, any of a first maximum current value and a second maximum current value larger than the first maximum current value being capable of being set as a maximum current value for driving in the drive unit; a detector for detecting a position of the lens unit in the optical axis direction; a lens operation unit that operates driving of the lens unit in the optical axis direction; and a computing unit that computes a positional command value for controlling driving of the lens unit based on a signal input from the lens operation unit, and controls the driving of the lens unit, wherein in the case where a difference between the positional command value and a lens position is larger than a predetermined positional difference threshold and the time during which the second maximum current value is continuously set as the maximum current value for the drive unit has not exceeded a predetermined high-current maximum time, the computing unit sets the second maximum current value as the maximum current value in the drive unit, and, in the case where the time during which the second maximum current value is continuously set as the maximum current value for the drive unit has exceeded the high-current maximum time or the difference between the positional command value and the lens position is not larger than the positional difference threshold, the computing unit sets the first maximum current value as the maximum current value in the drive unit.

According to the present invention, only in the case where one of the difference between the positional command value and the lens position and the difference between the speed command value and the drive speed exceeds the threshold set in the threshold setting unit, the maximum value of current selected in the drive unit is increased during the time set in the time setting unit. Accordingly, the lens system enabling lens drive characteristics to be improved can be provided, without affecting a camera.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention will hereinafter be described in detail with reference to accompanying drawings.

Embodiment 1

Figure 1:
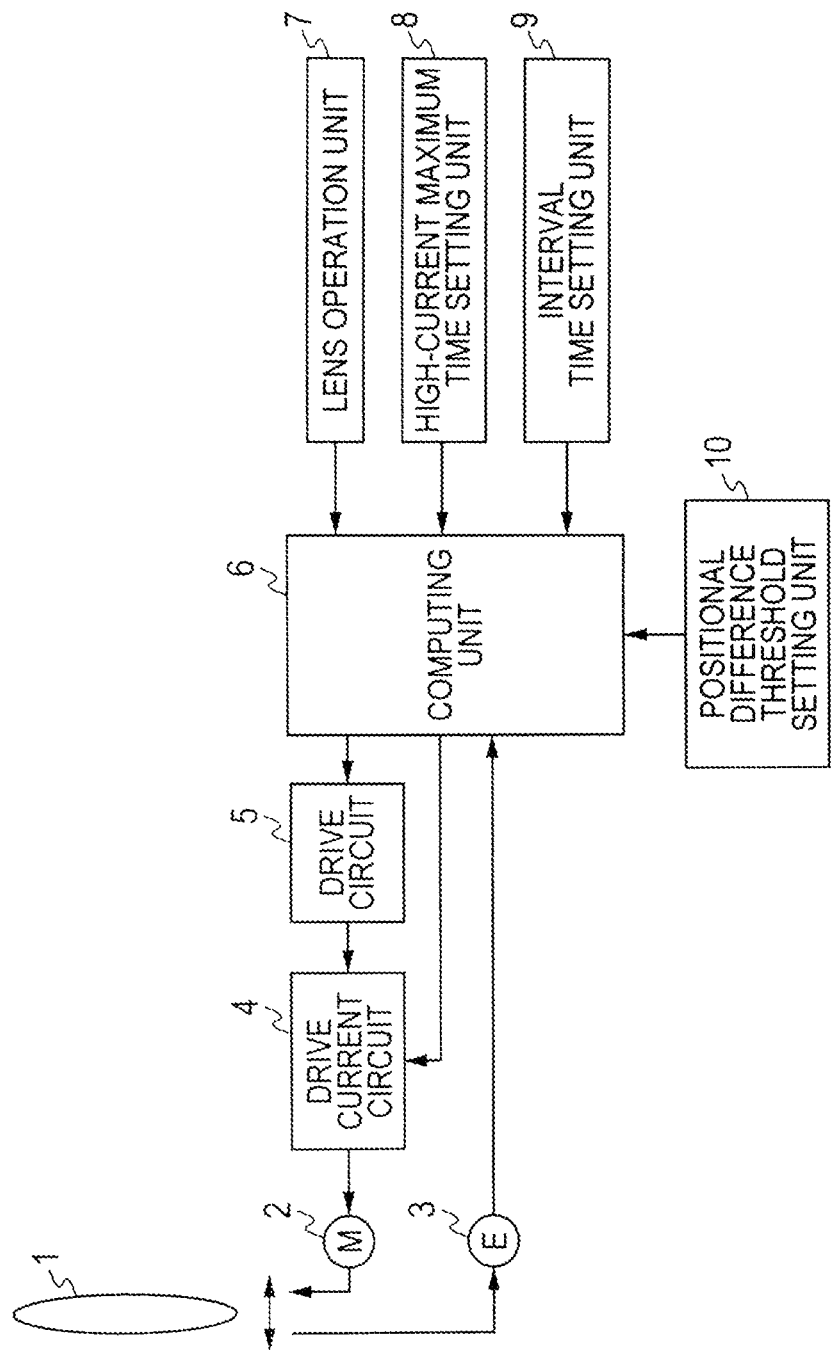
FIG. 1 is a block diagram illustrating a configuration of Embodiment 1.

Hereinafter referring to FIG. 1, a configuration of a lens system of a first embodiment of the present invention is described.

The lens system of this embodiment includes a lens unit 1, a motor 2 that is a drive unit for driving the lens unit 1 and a position detector 3 for detecting the position of the lens unit 1 in the optical axis direction. The lens system further includes a drive circuit 5 that generates a drive signal for driving the motor 2, and a computing unit 6 that performs computations for controlling the drive of the motor 2. The computing unit 6 outputs a lens operation signal according to an operation by an operator on the lens operation unit 7; the operation corresponds to a drive amount of the lens unit 1 as an object to be driven. A drive current circuit 4 supplies a drive current to the motor 2 based on the drive signal from the drive circuit 5. The drive current circuit 4 can set any one of a first maximum current value serving as a normal state and a second maximum current value larger than the normal state, as the maximum current limit capable of being supplied to the motor 2, based on a selection signal from the computing unit 6. A high-current maximum time setting unit 8 sets, in the drive current circuit 4, the maximum value (high-current maximum time) of time during which the second maximum current value larger than the normal state can continuously be set as the maximum current limit. The interval time setting unit 9 sets the minimum time (interval time) required from a moment when the maximum current limit for the drive current circuit 4 is changed from the second maximum current value larger than the normal state to the first maximum current value serving as the normal state to a moment when change to a second current limit is allowed. A positional difference threshold setting unit 10 sets an after-mentioned positional difference threshold to be used in the computing unit 6; the positional difference threshold is set to be considered in determination of setting the second maximum current value larger than the normal state as the maximum current limit in the drive current circuit 4.

Based on a lens operation signal output from the lens operation unit 7, the computing unit 6 calculates a positional command value of the lens to be controlled. At the same time, the computing unit 6 performs positional servo control computation based on the lens positional signal input from the lens position detector 3, and outputs a motor drive signal that is a result of the computation to the drive circuit 5, thus performing drive control of the lens to be controlled. Further, at the same time, the computing unit 6 performs computation based on setting values set in the high-current maximum time setting unit 8, the interval time setting unit 9 and the positional difference threshold setting unit 10, and outputs to the drive current circuit 4 a selection signal for setting the maximum current limit in the drive current circuit 4 as necessary.

In addition, the computing unit 6 includes also an interval timer that measures time having elapsed since the first maximum current value serving as the normal state is set as the maximum current limit in the drive current circuit 4, and a high-current timer that measures time having elapsed since the second maximum current value larger than the normal state is set in the drive current circuit 4 as the maximum current limit in the drive current circuit 4.

Figure 2:
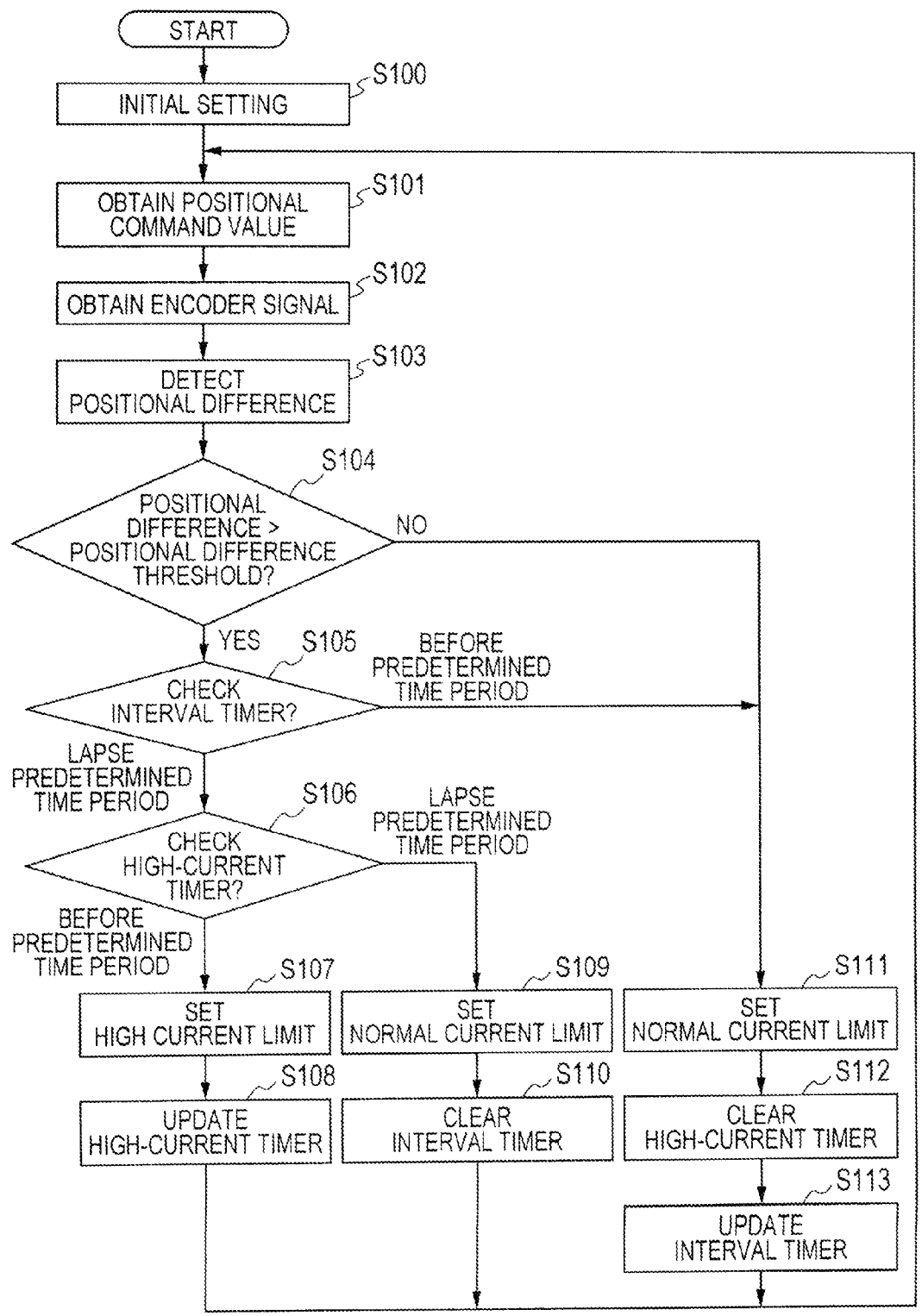
FIG. 2 is an operational flowchart of Embodiment 1.

FIG. 2 illustrates a flowchart of a series of processes performed by the computing unit 6.

The computing unit 6 repeatedly performs a series of processes in and after step S101 every predetermined time period.

In step S100, an initial setting is performed, and the interval timer and the high-current timer are cleared.

In step S101, the computing unit 6 calculates a positional command value of the lens based on the lens operation signal input from the lens operation unit 7. Methods of calculating the positional command value of the lens from the lens operation signal are generally different according to types of lenses to be operated. For instance, in a case of operating the lens unit which conducts the zooming function, the lens operation unit outputs a signal (speed command value) representing the magnitude of the zooming speed (drive speed) as the lens operation signal. In this case, the computing unit 6 calculates an amount of variation of the lens position at every predetermined time period from the input lens operation signal, adds the amount of variation to the lens position that is the previous processing result, thereby calculating the lens positional command value. In step S102, the present lens position is obtained according to the lens positional signal input from the lens position detector 3.

In step S103, a lens positional difference signal is calculated by subtracting the lens position obtained in step S102 from the lens positional command value calculated in step S101. Further, the positional difference threshold set in the positional difference threshold setting unit 10 is taken and compared with the calculated lens positional difference signal. According to the result of the comparison, in the case where the lens positional difference signal is less than or equal to the positional difference threshold, the processing proceeds to step S111; in the case where the lens positional difference signal is larger than the positional difference threshold, the processing proceeds to step S105.

In step S105, the computing unit 6 compares the measured value of the timer that measures time having elapsed since the moment when the maximum current limit set in the drive current circuit 4 and held in the computing unit is set to the first maximum current value serving as the normal state, with the interval time set in the interval time setting unit 9. In the case where the time having elapsed since the maximum current limit set in the drive current circuit 4 is set to the first maximum current value serving as the normal state is longer than the interval time, that is, in the case where it is determined that the interval time has elapsed since the first maximum current value that is the normal state is set as the maximum current limit in the drive current circuit 4, the processing proceeds to step S106. In the case where it is not determined that the time has elapsed, the processing proceeds to step S111.

In step S106, the time having elapsed since the maximum current limit for the drive current circuit 4 that is held in the computing unit is set to the second maximum current value larger than the normal state is compared with the high-current maximum time set in the high-current maximum time setting unit 8. In the case where the time having elapsed since the maximum current limit for the drive current circuit 4 is set to the second maximum current value larger than the normal state is longer than the high-current maximum time set in the high-current maximum time setting unit 8, that is, in the case where it is determined that the high-current maximum time set in the high-current maximum time setting unit 8 has elapsed since the maximum current limit for the drive current circuit 4 is set to the second maximum current value larger than the normal state, the processing proceeds to step S109; in the case where it is not determined that the time has elapsed, the processing proceeds to step S107.

In step S109, the maximum current limit for the drive current circuit 4 is set to the first maximum current value serving as the normal state. In step S110, the value of the interval timer, which measures the time having elapsed since the motor drive current selected in the drive current circuit 4 and held in the computing unit 6 is set to a normal state, is cleared, and subsequently, measurement of the time during which the motor drive current is set to the normal state is started, and the processing returns to step S101.

In step S107, the maximum current limit for the drive current circuit 4 is set to the second maximum current value larger than the normal state, subsequently the processing proceeds to step S108, the measurement value of the high-current timer that measures the time having elapsed since the maximum current limit for the drive current circuit 4 is set to the second maximum current value is updated, and the processing returns to step S101.

In step S111, the maximum current limit for the drive current circuit 4 is set to the first maximum current value serving as the normal state. In step S112, the measurement value of the high-current timer is cleared, subsequently in step S113 the value of the interval timer is updated, and the processing returns to step S101.

The processes as described above are performed, and the values of the high-current timer and the interval timer are appropriately set. Accordingly, the drive characteristics of the lens system can be improved without affecting the camera system carrying the lens system.

Embodiment 2

Figure 3:
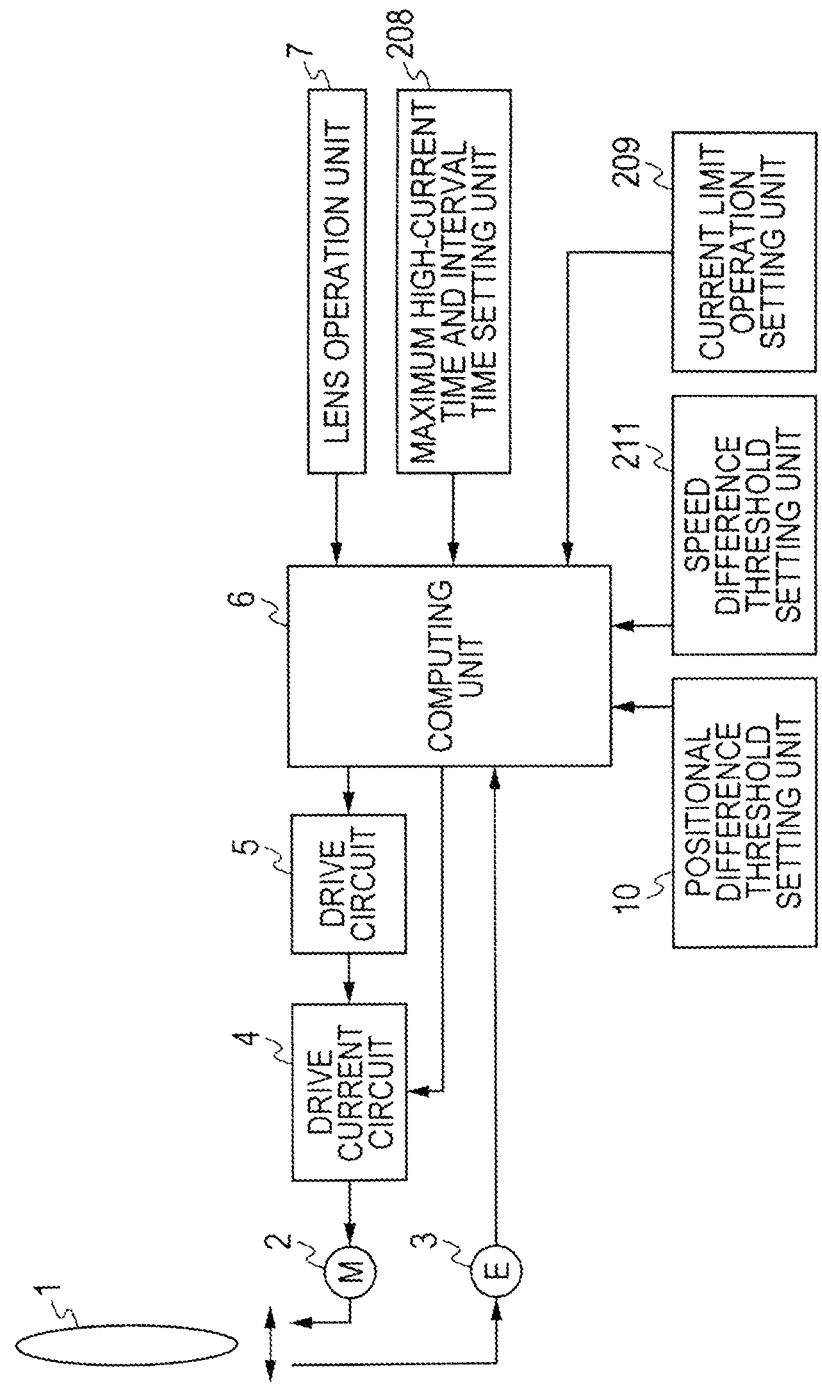
FIG. 3 is a block diagram illustrating a configuration of Embodiment 2.

Hereinafter referring to FIG. 3, a configuration of a lens system of a second embodiment of the present invention is described.

In the lens system of this embodiment, a lens unit 1, a motor 2 that is a drive unit for driving the lens unit 1, a position detector 3 for detecting the position of the lens unit 1 in the optical axis direction, a drive current circuit 4, a drive circuit 5 that generates a drive signal for driving the motor, a computing unit 6 for performing control computation for driving the motor, and a lens operation unit 7 that operates the lens unit 1 as an object to be driven are the same as those in the first embodiment. Accordingly, description thereof is omitted.

A high-current maximum time that is time during which the maximum current limit for the drive current circuit 4 can continuously be set to the second maximum current value larger than the normal state, and the minimum interval time required to be elapsed between a moment when the maximum current limit for the drive current circuit 4 is changed from the second maximum current value to the first maximum current value serving as the normal state and a moment when the maximum current limit is set to the second maximum current value again, are set in the high-current maximum time and interval time setting unit 208. The positional difference threshold setting unit 10 sets a threshold for the positional difference of the lens units that is used to determine whether to change the maximum current limit for the drive current circuit 4 to the second maximum current value larger than the normal state or not. Likewise, the speed difference threshold setting unit 211 sets a threshold for the speed difference of the lens units that is a criterion for whether to increase the maximum current limit or not. The current limit operation setting unit 209 determines operational conditions for increasing the current limit in view of conditions set in the speed difference threshold setting unit 211 and the positional difference threshold setting unit 10.

Figure 4:
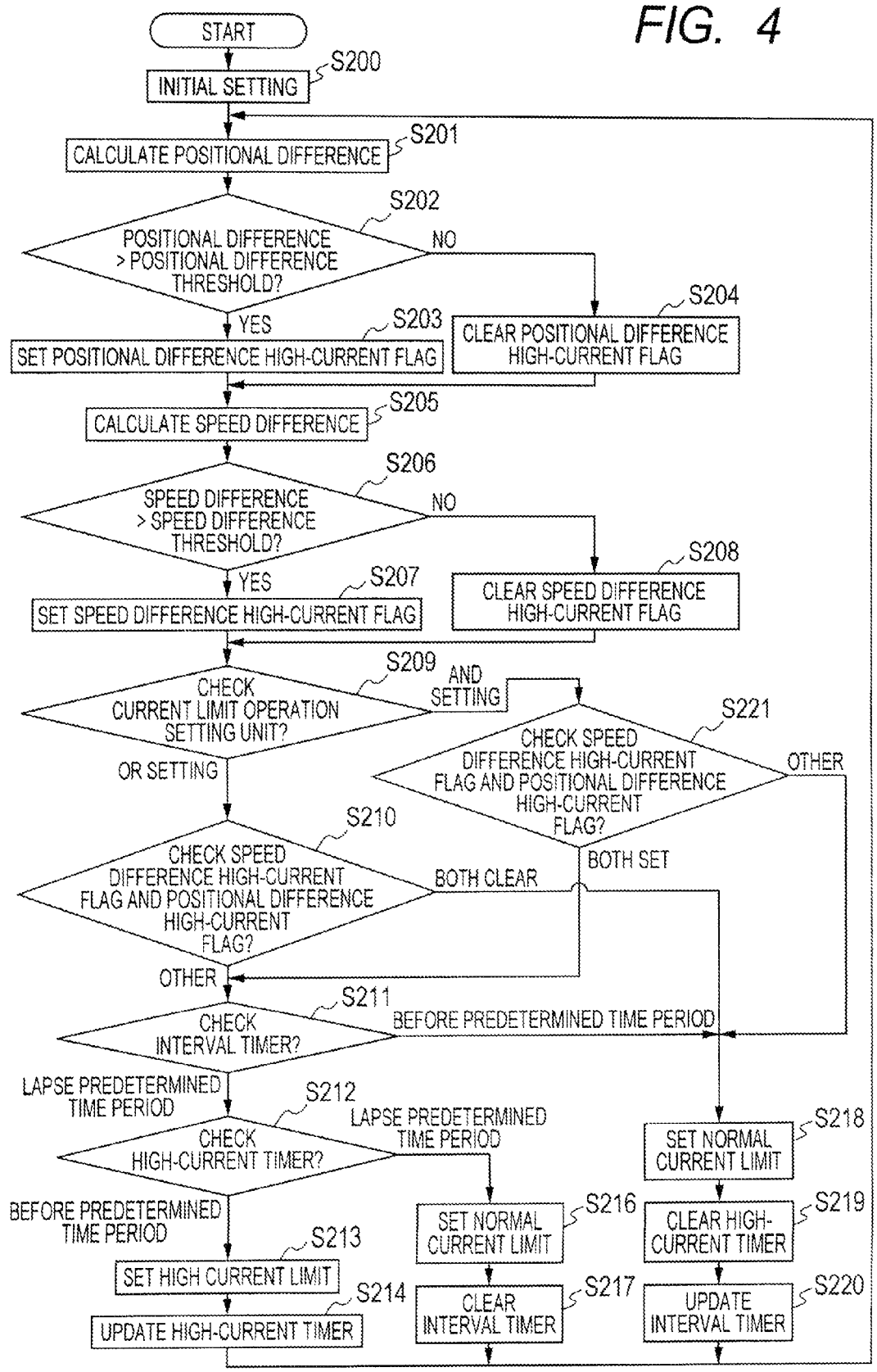
FIG. 4 is an operational flowchart of Embodiment 2.

Hereinafter referring to FIG. 4, a flowchart performed in a software process performed by the computing unit 6 will be described. Also in the second embodiment, as with the first embodiment, the computing unit 6 repeatedly performs a series of processes at and after step S201 at every predetermined time period.

In step S200, an initial setting is performed, and the interval timer and the high-current timer are cleared.

In step S201, the computing unit 6 calculates a positional command value of the lens unit based on a lens operation signal input from the lens operation unit 7. A lens positional difference signal is calculated by subtracting a lens position output from the position detector 3 from the calculated lens positional command value, and at the same time, a positional difference signal ($dP_0$) calculated in step S201 in the series of processes at and after step S201 in the last routine and a positional difference signal ($dP_1$) calculated in the current routine are stored.

In step S202, the calculated lens positional difference signal $dP_1$ is compared with a positional difference threshold set in the positional difference threshold setting unit 10. In the case where the positional difference $dP_1$ calculated in step S201 is larger than the positional difference threshold, the processing proceeds to step S203. In the case where the positional difference $dP_1$ is less than or equal to the threshold, the processing proceeds to step S204.

In step S203, a positional difference high-current flag that indicates that the positional difference is in a condition sufficient to increase the maximum current limit for the drive current circuit 4 is set, and the processing proceeds to step S205. Likewise, in step S204, since the positional difference is in the condition incapable of increasing the maximum current limit for the drive current circuit 4, the positional difference high-current flag is cleared and the processing proceeds to step S205.

In step S205, a speed difference (drive speed difference) is calculated based on a result obtained by subtracting the positional difference $dP_0$ calculated in the processes in the last routine from the positional difference $dP_1$ calculated and stored in step S201, and the processing proceeds to step S206. The speed difference is an amount corresponding to an acceleration of the lens drive because the speed difference is calculated based on the lens positional difference calculated every unit time. In step S206, the calculated speed difference is compared with a threshold of the speed difference set in the speed difference threshold setting unit 211 illustrated in FIG. 3. In the case where the speed difference is larger than the threshold, the processing proceeds to step S207. In the case where the speed difference is less than or equal to the threshold, the processing proceeds to step S208.

In step S207, a speed difference high-current flag indicating that the speed difference is in a condition sufficient to set the maximum current limit for the drive current circuit 4 to the second maximum current value larger than the normal state is set, the processing proceeds to step S209. Likewise, in step S208, since the speed difference is in the condition where the current limit is not necessary to be increased, the positional difference high-current flag is cleared and the processing proceeds to step S209.

In step S209, the setting state of the current limit operation setting unit 209 is determined and the flow is branched. In the case where the setting of the current limit operation setting unit 209 is a setting to determine the positional difference high-current flag and the speed difference high-current flag by "logical product", the processing proceeds to step S221. In the case where the setting is a setting determined by "logical addition", the processing proceeds to step S210. In step S210, in the case where both the positional difference high-current flag and the speed difference high-current flag have been cleared, the processing transitions to step S218. In the case where any of the flags has not been cleared, the processing proceeds to step S211. In step S221, in the case where both the positional difference high-current flag and the speed difference high-current flag have been set, the processing proceeds to step S211. In the case where any of the flags has not been set, the processing proceeds to step S218.

In step S211, the measurement time of the interval timer in the computing unit 6 is compared with the interval time set in the high-current maximum time and interval time setting unit 208. In the case where the time (the measurement time of the interval timer) having elapsed since the maximum current limit set in the drive current circuit 4 is set to the first maximum current value serving as the normal state is longer than the interval time, that is, in the case where it is determined that the interval time set in the current limit operation setting unit 209 has elapsed since the current is set to the first maximum current value that is the normal state as the maximum current limit for the drive current circuit 4, the processing proceeds to step S212; in the case where it is not determined that the time has elapsed, the processing proceeds to step S218.

In step S212, a measurement time of the high-current timer in the computing unit 6 is compared with the high-current maximum time set in the high-current maximum time and interval time setting unit 208. In the case where the measurement time of the high-current timer that is the time having elapsed since the maximum current limit for the drive current circuit 4 is set to the second maximum current value larger than the normal state is longer than the high-current maximum time set in the high-current maximum time and interval time setting unit 208, that is, in the case where it is determined that the high-current maximum time set in the high-current maximum time and interval time setting unit 208 has elapsed since the maximum current limit for the drive current circuit 4 is set to the second maximum current value larger than the normal state, the processing proceeds to step S216; in the case where it is not determined that the time has not elapsed, the processing proceeds to step S213.

In step S216, the first maximum current value serving as the normal state is set as the maximum current limit in the drive current circuit 4, and the processing proceeds to step S217. In step S217, the value of the interval timer is cleared, then measurement of time by the interval timer is started, and subsequently the processing returns to step S201.

In step 213 branched from step S212, the second maximum current value larger than the normal state is set as the maximum current limit for the drive current circuit 4, and subsequently the processing proceeds to step S214. In step S214, the measurement value of the high-current timer is updated, and the processing returns to step S201.

In step S218, branched from one of steps S210, S211 and S221, the motor drive current selected by the drive current circuit 4 is set to the normal state (first maximum current value), and subsequently the processing proceeds to step S219. In step S219, the measurement value of the high-current timer is cleared, and subsequently the processing proceeds to step S220. In step S220, the value of the interval timer is updated, and the processing returns to step S201.

The values of the high-current timer and the interval timer are appropriately set according to the camera system, to which the lens system is mounted on, by repeatedly performing the series of processes described above. Accordingly, the drive characteristics of the lens system can be improved without affecting the camera system.

Embodiment 3

Figure 5:
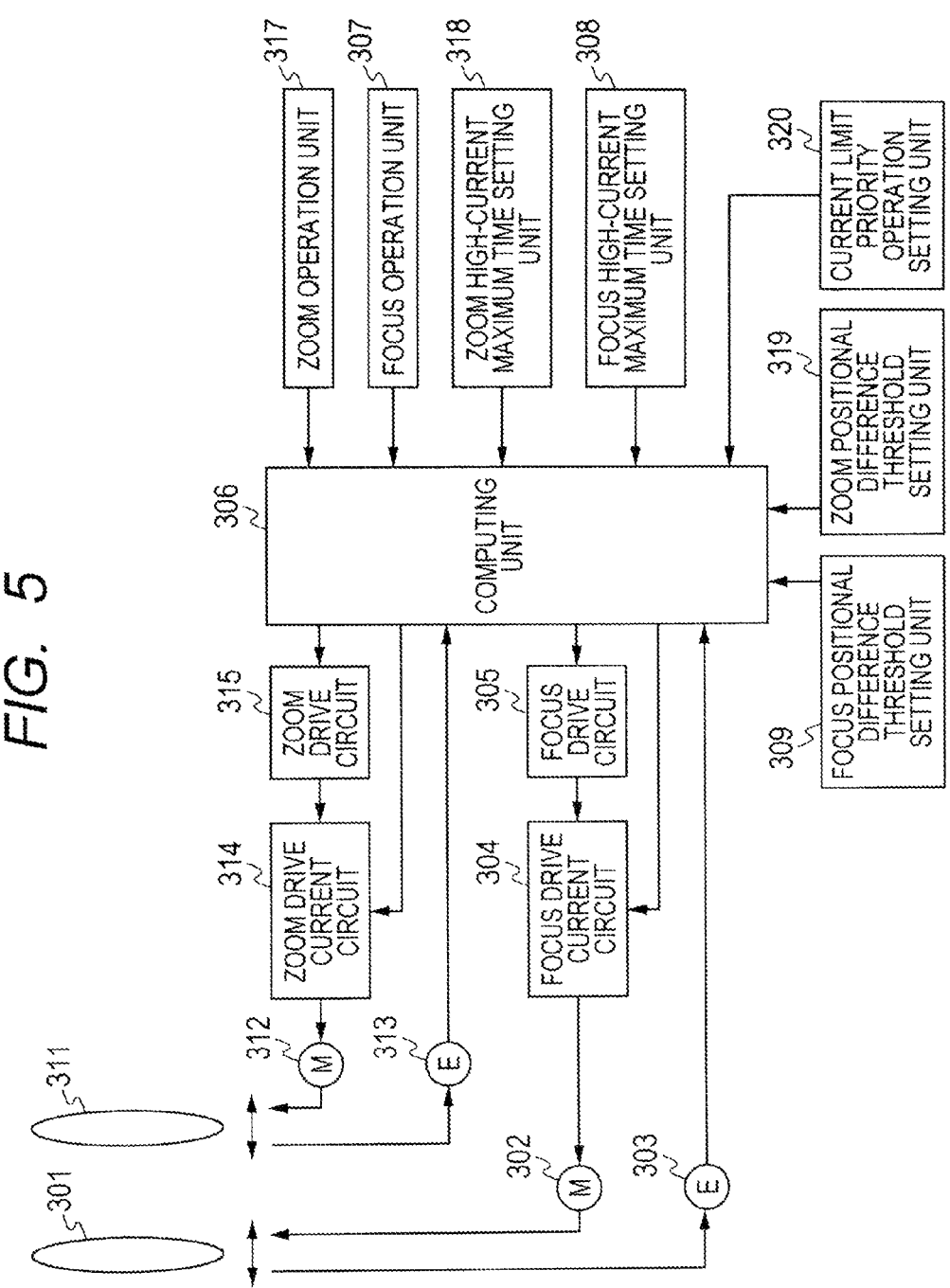
FIG. 5 is a block diagram illustrating a configuration of Embodiment 3.

Hereinafter referring to FIG. 5, a configuration of a lens system of a third embodiment of the present invention is described.

The lens system of the third embodiment includes a focus lens unit 301 that conducts a focusing function, and a zoom lens unit 311 that conducts a zoom function. The focus lens unit 301 is driven by the focus motor 302. The position of the focus lens unit 301 in the optical axis direction is detected by a focus position detector 303. A focus drive current circuit 304 selects a maximum value of current to be supplied to the focus motor 302 for driving the focus lens unit 301 according to a selection signal output from an after-mentioned computing unit 306. The focus drive circuit 305 as a focus drive unit generates a drive signal for driving the focus motor 302.

Likewise, the zoom lens unit 311 is driven by a zoom motor 312. The position of the zoom lens unit 311 in the optical axis direction is detected by the zoom position detector 313. A zoom drive current circuit 314 selects a maximum value of current to be supplied to the zoom motor 312 for driving the zoom lens unit 311 according to a selection signal output from the after-mentioned computing unit 306. A zoom drive circuit 315 as a zoom drive unit generates a drive signal for driving the zoom motor 312.

The computing unit 306 performs control computation for motor-driving the zoom lens unit 311 and the focus lens unit 301. A zoom operation unit 317 performs a drive operation of the zoom lens unit 311 in the optical axis direction, and outputs a zoom operation signal to the computing unit 306 according to a zoom operation by an operator. The focus operation unit 307 performs a drive operation of the focus lens unit 301 in the optical axis direction, and outputs a focus operation signal to the computing unit 306 according to a focus operation by the operator as with the zoom operation unit 317.

A zoom high-current maximum time setting unit 318 sets a zoom high-current maximum time that is an upper limit of time during which the maximum value of current capable of being supplied to the zoom motor 312 is continuously set to a value (second maximum current value) larger than the normal state (first maximum current value). Likewise, the focus high-current maximum time setting unit 308 sets a focus high-current maximum time that is an upper limit of time during which the maximum value of current capable of being supplied to the focus motor 302 is continuously set to a value (fourth maximum current value) larger than the normal state (third maximum current value).

In a case of setting the current supplied to one of the zoom motor 312 and the focus motor 302 to be larger than the current in the normal state, the current limit priority operation setting unit 320 sets which one of the zoom motor 312 and the focus motor 302 is set to have a priority. The zoom positional difference threshold setting unit 319 sets a threshold (zoom positional difference threshold) for the zoom positional difference that is a difference between an after-mentioned zoom positional command value and the zoom position, as a criterion for setting the maximum current limit capable of being supplied to the zoom motor 312 to the second maximum current value. The focus positional difference threshold setting unit 309 sets a threshold (focus positional difference threshold) for a focus positional difference that is the difference between an aftermentioned focus positional command value and the focus position, as a criterion for setting the maximum current limit capable of being supplied to the focus motor 302 to the fourth maximum current value.

The computing unit 306 includes: a focus interval timer that measures time having elapsed since setting of the maximum current limit in the focus drive current circuit 304 is changed from the fourth maximum current value larger than the normal state to the third maximum current value serving as the normal state; a focus high-current timer that measures time having elapsed since the fourth maximum current value larger than the normal state is set as the maximum current limit in the focus drive current circuit 304; a zoom interval timer that measures time having elapsed since the maximum current limit in the zoom drive current circuit 314 is changed from the second maximum current value larger than the normal state to the first maximum current value as the normal state; and a zoom high-current timer that measures time having elapsed since the second maximum current value larger than the normal state is set as the maximum current limit in the zoom drive current circuit 314.

Figure 6B:
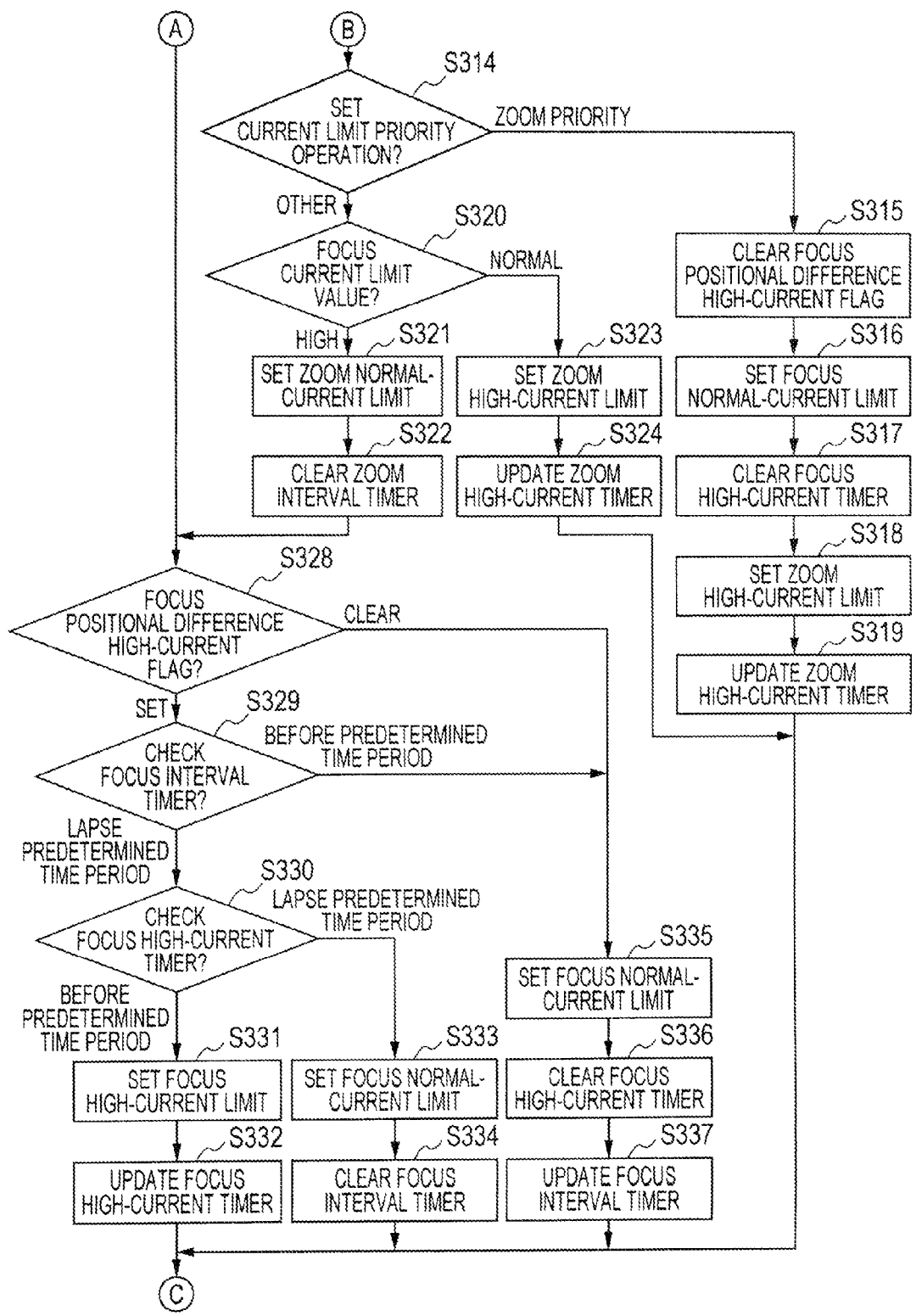
FIG. 6 is comprised of FIGS. 6A and 6B, showing an operational flowchart of Embodiment 3.

Hereinafter referring to FIGS. 6A and 6B, a flow of a software process performed in the computing unit 306 will be described. Also in the third embodiment, as with the first and second embodiments, the computing unit 306 repeatedly performs a series of processes of steps S301 to S337 at every predetermined time period.

In step S300, initial settings are made, that is, the zoom interval timer, the zoom high-current timer, the focus interval timer and the focus high-current timer are cleared.

In step S301, the computing unit 306 calculates the positional command value of the zoom lens unit 311 based on the zoom lens operation signal input from the zoom operation unit 317. Further, the zoom lens positional difference is calculated by subtracting the zoom lens positional signal that has been input from the zoom position detector 313 and represents the present lens position from the zoom lens positional command value.

In step S302, the calculated zoom lens positional difference is compared with the zoom positional difference threshold set in the zoom positional difference threshold setting unit 319. In the case where the zoom positional difference is larger than the zoom positional difference threshold, the processing proceeds to step S303. In the case where the positional difference is less than or equal to the zoom positional difference threshold, the processing proceeds to step S304.

In step S303, a zoom positional difference high-current flag that indicates that the zoom positional difference is in a condition for setting the second maximum current value larger than the normal state as the maximum current limit in the zoom drive current circuit 314 is set, and the processing proceeds to step S305. Likewise, in step S304, since the zoom lens positional difference is in a condition unnecessary to set the second maximum current value larger than the normal state as the maximum current limit in the zoom drive current circuit 314, the zoom positional difference high-current flag is cleared, and the processing proceeds to step S305.

Steps S305 to S308 are processes on the focus lens unit 301. In step S305, the computing unit 306 calculates the positional command value of the focus lens unit 301 based on the focus lens operation signal input from the focus operation unit 307. Further, the focus lens positional difference is calculated by subtracting the focus lens positional signal that has been input from the focus position detector 303 and represents the present lens position from the calculated focus lens positional command value.

In step S306, the calculated focus lens positional difference is compared with the focus positional difference threshold set in the focus positional difference threshold setting unit 309. In the case where the focus lens positional difference is larger than the focus positional difference threshold, the processing proceeds to step S307. In the case where the focus lens positional difference is less than or equal to the focus positional difference threshold, the processing proceeds to step S308.

In step S307, a focus positional difference high-current flag that indicates that the focus lens positional difference is in a condition for setting the fourth maximum current value larger than the normal state as the maximum current limit in the focus drive current circuit 304 is set, and the processing proceeds to step S309. Likewise, in step S308, since the focus lens positional difference is in a condition unnecessary to set the fourth maximum current value larger than the normal state as the maximum current limit in the focus drive current circuit 304, the focus positional difference high-current flag is cleared and the processing proceeds to step S309.

In step S309, the state of the zoom positional difference high-current flag set or cleared in the process of one of steps S303 and S304 is checked. In the case where the flag is set, the processing proceeds to step S310. In the case where the flag is cleared, the processing proceeds to step S325.

In step S310, the computing unit 306 compares the measurement value of the zoom interval timer with a predetermined zoom interval time, which is the minimum time necessary to set the maximum current limit to the second maximum current value again after the setting of the maximum current limit from the second maximum current value larger than the normal value to the first maximum current value. In the case where the measurement value of the zoom interval timer that is a time having elapsed since the maximum current limit for the zoom drive current circuit 314 is set to the first maximum current value that is the normal value is larger than the predetermined zoom interval time, that is, In the case where the predetermined zoom interval time has elapsed since the maximum current limit for the zoom drive current circuit 314 is set to the first maximum current value, the processing proceeds to step S311; and In the case where the time has not elapsed, the processing proceeds to step S325.

In step S311, the computing unit 306 compares the measurement value of the zoom high-current timer with the zoom high-current maximum time, which is set in the zoom high-current maximum time setting unit 318 as an upper limit time during which the second maximum current value larger than the normal value can continuously be set as the maximum current limit for the zoom drive current circuit 314. In the case where the measurement value of the zoom high-current timer that is a time having elapsed since the maximum current limit for the zoom drive current circuit 314 is set to the second maximum current value is longer than the zoom high-current maximum time, that is, in the case where the zoom high-current maximum time has elapsed since the maximum current limit for the zoom drive current circuit 314 is set to the second maximum current value, the processing proceeds to step S312; and in the case where the time has not elapsed, the processing proceeds to step S314.

In step S312, the maximum current limit for the zoom drive current circuit 314 is set to the first maximum current value serving as the normal state, and the processing proceeds to step S313.

In step S313, the value of the zoom interval timer in the computing unit 306 is cleared and then measurement is started, and the processing proceeds to step S328.

In processes of steps S325 to step S327 branched from steps S309 and S310, a series of processes of holding the zoom drive current to the normal state (setting the maximum current limit to the first maximum current value) are performed. In step S325, the maximum current limit for the zoom drive current circuit 314 is set to the first maximum current value serving as the normal value. In step S326, the zoom high-current timer in the computing unit 306 is cleared. In step S327, the value of the zoom interval timer in the computing unit 306 is cleared, the processing proceeds to step S328.

Processes of steps S314 to S319, steps S314 to S322 and steps S314 to S324 that have been branched from step S311 indicate processes in a case where a zoom priority operation according to the setting state of the current limit priority operation setting unit 320 is valid, and processes in an invalid case.

In step S314, the setting state of the current limit priority operation setting unit 320 is determined. In the case where the zoom priority operation is valid, the processing proceeds to step S315; in the case where the zoom priority operation is invalid, the processing proceeds to step S320. In steps S315 to S319, processes of setting the maximum current limit for the zoom drive current circuit 314 to the second maximum current value larger than the normal state and of setting the maximum current limit for the focus drive current circuit 304 to the third maximum current value serving as the normal state are performed. In step S315, the focus positional difference high-current flag is cleared to set a focus drive current limit to the normal state in a process thereafter. This process is for causing the process thereafter to determine that the state is incapable of increasing the focus drive current. In step S316, the maximum current limit for the focus drive current circuit 304 is set to the third maximum current value serving as the normal state. In step S317, the focus high-current timer in the computing unit 306 is cleared. In step S318, the maximum current limit for the zoom drive current circuit 314 is set to the second maximum current value larger than the normal state, and the processing proceeds to step S319. In step S319, the time of the zoom high-current timer in the computing unit 306 is updated, and the processing returns to step S301.

In the case where the setting of the current limit priority operation setting unit 320 is not the zoom priority, the processing is branched from step S314 to step S320 and processes for setting the focus motor drive current limit is performed. In step S320, the computing unit 306 checks the setting state of the focus drive current circuit 304. In the case where it is determined that the maximum current limit is set to the fourth maximum current value larger than the normal state, the processing is branched to step S321. In the case where it is determined that the limit is set to the third maximum current value serving as the normal state, the processing proceeds to step S323.

In step S321 (in a case where the maximum current limit for the focus drive current circuit 304 is set to the fourth maximum current value larger than the normal state), the maximum current limit for the zoom drive current circuit 314 is set to the first maximum current value serving as the normal state to avoid damage to the camera system. In step S322, the value of the zoom interval timer is cleared, and subsequently the processing proceeds to step S328 to set the maximum current limit for the focus drive current circuit.

In step S323 (in a case where the maximum current limit for the focus drive current circuit 304 is set to the third maximum current value serving as the normal state), the maximum current limit for the zoom drive current circuit 314 is set to the fourth maximum current value larger than the normal value, and the processing proceeds to step S324. In step S324, the zoom high-current timer in the computing unit 306 is updated, and the processing returns to step S301.

In processes subsequent to step S328, the maximum current limit for the focus drive current circuit 304 is set. In step S328, the state of the focus positional difference high-current flag set or cleared in one of the processes in steps S307 and S308 is checked. In the case where the flag is set, the processing proceeds to step S329. In the case where the flag is cleared, the processing proceeds to step S335.

In step S329, the measurement value of the focus interval timer in the computing unit 306 is compared with a focus interval predetermined time period, which is the minimum time necessary to elapse since the maximum current limit for the focus drive current circuit 304 is set to the fourth maximum current value larger than the normal state again after the maximum current limit for the focus drive current circuit 304 is returned to the third maximum current value as the normal state. In the case where the measurement value of the focus interval timer that is the time having elapsed since the maximum current limit for the focus drive current circuit 304 is set to the third maximum current value serving as the normal state is larger than the previously set focus interval predetermined time period, that is, in the case where it is determined that the focus interval predetermined time period has elapsed since the maximum current limit for the focus drive current circuit 304 is set to the third maximum current value as the normal state, the processing proceeds to step S330. In the case where it is not determined that the time has elapsed, the processing proceeds to step S335.

In step S330, the measurement value of the focus high-current timer in the computing unit 306 is compared with the focus high-current maximum time set in the focus high-current maximum time setting unit 308. In the case where the time having elapsed since the maximum current limit for the focus drive current circuit 304 is set to the fourth maximum current value larger than the normal state is longer than the focus high-current maximum time, that is, in the case where it is determined that the focus high-current maximum time has elapsed since the maximum current limit for the focus drive current circuit 304 is set to the fourth maximum current value, the processing proceeds to step S333. In the case where it is not determined that the time has elapsed, the processing proceeds to step S331.

In step S333, the maximum current limit for the focus drive current circuit 304 is set to the third maximum current value serving as the normal value, the processing proceeds to step S334. In step S334, the value of the focus interval timer in the computing unit 306 is cleared and subsequently the processing returns to step S301, the series of processes are repeated.

In step S331, the maximum current limit for the focus drive current circuit 304 is set to the fourth maximum current value larger than the normal state, and subsequently the processing proceeds to step S332. In step S332, the focus high-current timer in the computing unit 306 is updated, and the processing returns to step S301 to repeat the series of processes.

Finally, in step S335 branched from one of steps S328 and S329, the third maximum current value serving as the normal state is set as the maximum current limit for the focus drive current circuit 304. In step S336, the focus high-current timer in the computing unit 306 is cleared. Finally, in step S337, the focus high-current timer is updated, and the processing returns to step S301 to repeat the series of processes.

The lens system of the present invention having been described above and an image taking system that is connected with this lens system and includes a camera system for taking a subject image formed by the lens system enable the value of current supplied to the motor as necessary in the lens system to be increased without affecting the camera system. Accordingly, the imaging system capable of improving the drive characteristics of the lens system can be realized.

The embodiments exemplify the case where the maximum value of the drive current for the motor that is the drive unit of the lens apparatus can be selected from the two maximum current values, which are the normal maximum current value and the current value larger than the normal state. However, the present invention is not limited thereto. In addition to the normal maximum current value, at least two current values that are larger than the normal state may be selectable as the maximum value of the drive current of the motor that is the drive unit of the lens apparatus. Note that an appropriate maximum current value may be selected from among the at least two maximum current values larger than the normal state based on the magnitudes of the focus positional difference and the zoom positional difference with the respect thresholds; the advantageous effects of the present invention can be enjoyed also according to this configuration.

Although the exemplary embodiments of the present invention have been described above, the present invention is not limited thereto. Various changes and modifications can be made within the scope of the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281453, filed Dec. 17, 2010, which is hereby incorporated by reference herein in its entirety.

What is claimed is:

1. A lens system, comprising:
   a lens unit;
   a drive unit for driving the lens unit in an optical axis direction, configured such that any one of a first maximum current value serving as a normal state and a second maximum current value larger than the first maximum current value can be set as a maximum current value of a drive current supplied for driving;
   a detector for detecting a position of the lens unit in the optical axis direction;
   a lens operation unit for operating driving of the lens unit in the optical axis direction;
   a computing unit for computing a positional command value and optionally a speed command value, both for controlling driving of the lens unit based on a signal input from the lens operation unit, and controlling the driving of the lens unit; and
   a timer for measuring a time during which the second maximum current value is continuously set as the maximum current value in the drive unit,
   wherein
   in a case in which
      a difference between the positional command value and a lens position is larger than a predetermined positional difference threshold, and/or
      a difference between the speed command value, when further computed by the computing unit, and a drive speed is larger than a predetermined speed difference threshold, and
      the time measured by the timer has not exceeded a predetermined high-current maximum time which is a predetermined maximum value of time during which the second maximum current value can continuously be set as the maximum current value, the computing unit sets the second maximum current value as the maximum current value in the drive unit; and
   otherwise, the computing unit sets the first maximum current value as the maximum current value in the drive unit.

2. The lens system according to claim 1, further comprising:
   a time setting unit for setting the predetermined high-current maximum time; and
   a threshold setting unit for setting the predetermined positional difference threshold.

3. The lens system according to claim 2, wherein
   the computing unit further computes the speed command value for controlling driving of the lens unit based on the signal input from the lens operation unit,
   the threshold setting unit further sets the predetermined speed difference threshold.

4. The lens system according to claim 2, wherein the high-current maximum time set in the time setting unit is changed in the lens system according to a camera system connected to the lens system.

5. The lens system according to claim 2, wherein
   the time setting unit sets an interval time that is a minimum time necessary to elapse since the maximum current value for the drive unit is set from the second maximum current value to the first maximum current value in order to set the maximum current value for the drive unit to the second maximum current value again, and
   in a case in which the maximum current value of the drive unit is changed from the second maximum current value to the first maximum current value, the value is changeable to the second maximum current value only after the interval time elapses since the change.

6. The lens system according to claim 5, wherein the interval time set in the time setting unit is changeable in the lens system according to a camera system connected to the lens system.

7. The lens system according to claim 2,
   wherein
   the lens unit includes a zoom lens unit and a focus lens unit,
   the drive unit includes a zoom drive unit for driving the zoom lens unit in the optical axis direction during zooming and, in the zoom drive unit, any of the first maximum current value and the second maximum current value larger than the first maximum current value is settable as a maximum current value for the driving of the zoom lens unit, and the drive unit further includes a focus drive unit for driving the focus lens unit in the optical axis direction during focusing and, in the focus drive unit, any of a third maximum current value and a fourth maximum current value larger than the third maximum current value is settable as the maximum current value for the driving of the focus lens unit,
   the detector includes a zoom position detector for detecting a position of the zoom lens unit in the optical axis direction, and a focus position detector for detecting a position of the focus lens unit in the optical axis direction,
   the lens operation unit includes a zoom operation unit for operating driving of the zoom lens unit in the optical axis direction, and a focus operation unit for operating driving of the focus lens unit in the optical axis direction, and configured such that
   in a case in which the second maximum current value is set as the maximum current value for the zoom drive unit, the fourth maximum current value is not set as the maximum current value for the focus drive unit, and
   in a case in which the fourth maximum current value is set as a maximum current value for the focus drive unit, the second maximum current value is not set as the maximum current value for the zoom drive unit.

8. The lens system according to claim 7, wherein, in a case in which the second maximum current value is set as the maximum current value for the zoom drive unit, the maximum current value for the focus drive unit is changed to the third maximum current value and subsequently the maximum current value for the zoom drive unit is changed to the second maximum current value.

9. An image pickup system, comprising: the lens system according to claim 1; and
   a camera system that is connected to the lens system and adapted to take a subject image formed by the lens system.

* * * * *